United States Patent [19]

F'Geppert

[11] 4,063,467

[45] Dec. 20, 1977

[54] SPEED CHANGE AND REVERSER DEVICE

[75] Inventor: Erwin F'Geppert, Novi, Mich.

[73] Assignee: The United States of America as represented by the Secretary of the Army, Washington, D.C.

[21] Appl. No.: 694,511

[22] Filed: June 9, 1976

[51] Int. Cl.² .......................................... F16H 55/52
[52] U.S. Cl. ................................ 74/689; 74/230.17 A
[58] Field of Search ........................ 74/230.17 A, 689

[56] References Cited

FOREIGN PATENT DOCUMENTS 951,064 10/1956 Germany ................................ 74/689

*Primary Examiner*—Alan Cohan
*Attorney, Agent, or Firm*—Peter A. Taucher; John E. McRae; Nathan Edelberg

[57] ABSTRACT

A speed changer comprising a stationary pulley and a powered shaft defining a sun axis. Two adjustable diameter planet pulleys and a pair of power-transmitting belts transmit power to an output sun pulley coaxially aligned with the stationary pulley. An adjustment screw inversely varies the diameters of the two sun pulleys; resultant changes in belt tension produce changes in the diameters of the planet pulleys.

2 Claims, 2 Drawing Figures

4,063,467

SPEED CHANGE AND REVERSER DEVICE

BACKGROUND AND SUMMARY OF THE INVENTION

The invention contemplates a speed changer that can be adjusted or controlled to provide a range of speed ratios in both the forward and reverse directions. The mechanism is designed so that in one intermediate setting the output speed is zero. Actuation of a single control device provides graduated change from the forward speed range through zero output speed and into the reverse speed range.

THE DRAWINGS

Figure 1:
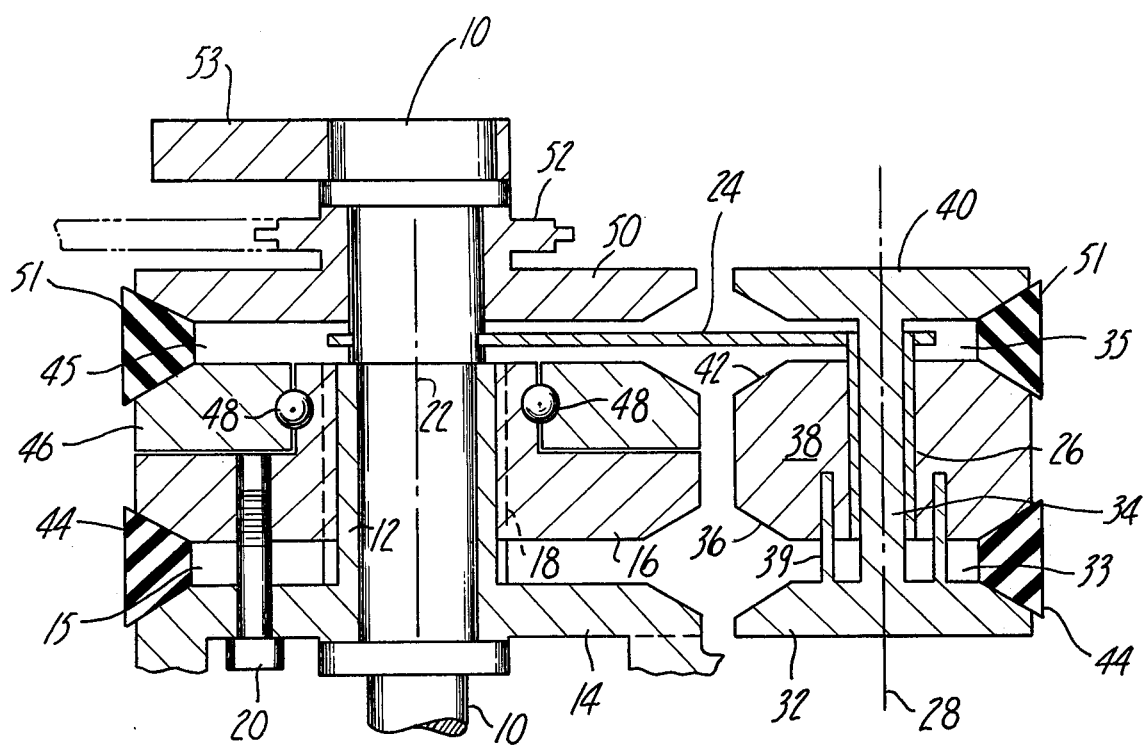
FIG. 1 is a sectional view taken through one embodiment of the invention.

The speed changer shown in FIG. 1 comprises a drive shaft 10 mounted for rotatable movement in a sleeve structure 12 projecting from a stationary pulley half section 14. Any conventional anchor mechanism (not shown) may be used to retain pulley half section 14 in a stationary position. A cooperating pulley half section 16 is slidably keyed at 18 to the outer surface of sleeve structure 12, whereby section 16 can be moved toward or away from half section 14 to vary the diameter of the defined pulley 15. An adjustment screw 20 is extended through an opening in half section 14 into a tapped hole in pulley half section 16, to produce the desired movement of section 16. The screw can be turned manually or by a torque or load-responsive mechanism (not shown). As the screw is turned, pulley half section 16 moves axially to either increase or decrease the diameter of the non-rotary pulley 15.

Shaft 10 defines a sun axis 22. Extending outwardly from shaft 10 is a plate-like planet pulley carrier 24 equipped with a sleeve type planet shaft 26. Sleeve 26 defines a planet axis 28. Two planet pulleys are coaxially mounted on sleeve 26 for simultaneous rotation around planet axis 28 and sun axis 22. One planet pulley 33 is defined by the flange 32 of spool 34 and an end face 36 of a roller 38. A second planet pulley 35 is defined by flange 40 of spool 34 and an end face 42 of roller 38. Spool 34 and roller 38 may be keyed on one another by means of pins 39 or other keying structure (not shown). Slidable movement of roller 38 along axis 28 inversely varies the diameters of planet pulleys 33 and 35.

A first V-belt 44 is trained around planet pulley 33 and stationary sun pulley 15. As shaft 10 rotates around sun axis 22 the carrier plate 24 translates the planet pulleys 33 and 35 in an orbital motion around axis 22. Belt 44 grips the surfaces of stationary pulley 15 so that the belt has zero translational speed relative to the pulley 15; therefore the belt produces rotational movement of pulleys 33 and 35 around planet axis 28.

Planet pulley 35 is radially aligned with a fourth freely rotatable sun pulley 45 centered on axis 22. Pulley 45 comprises a half section 46 that is swivably connected to pulley section 16 via ball bearings 48. Pulley 45 also includes a half section 50 that freely swivably encircles shaft 10. A V-belt 51 is trained around planet pulley 35 and sun pulley 45 for transmitting a drive force from one pulley to the other. Half section 50 of pulley 45 carries a gear or sprocket 52 that constitutes the output element of the speed changer mechanism. A chain or other gear (not shown) transmits the output motion to any suitable power-using device. A counterweight 53 can be carried by shaft 10 to compensate for the unbalance created by the planet pulley assembly.

The power-transmission path comprises shaft 10, carrier plate 24, planet pulleys 33 and 35, belt 51, sun pulley 45, and sprocket 50. Shaft 10 rotation around sun axis 22 causes belt 44 to produce rotational movement of pulleys 33 and 35 around planet axis 28; belt 51 transmits planet pulley rotation to sun pulley 45. The device could be utilized with sprocket 52 as the input element and shaft 10 as the output element. However for ease of description I will consider shaft 10 as the input and sprocket 52 as the output.

FIG. 1 shows positions taken by certain components to produce zero output speed. The nominal diameters of sun pulleys 15 and 45 are the same, and the nominal diameters of planet pulleys 33 and 35 are the same. Planet pulley rotation produced by belt 44 in one direction is equivalent to sun pulley 45 rotation produced by belt 51 in the opposite direction. Pulley 45 therefore remains stationary no matter how slow or how fast shaft 10 may be rotating. Pulleys 15 and 45 "rotate" at the same speed, i.e. zero speed.

Figure 2:
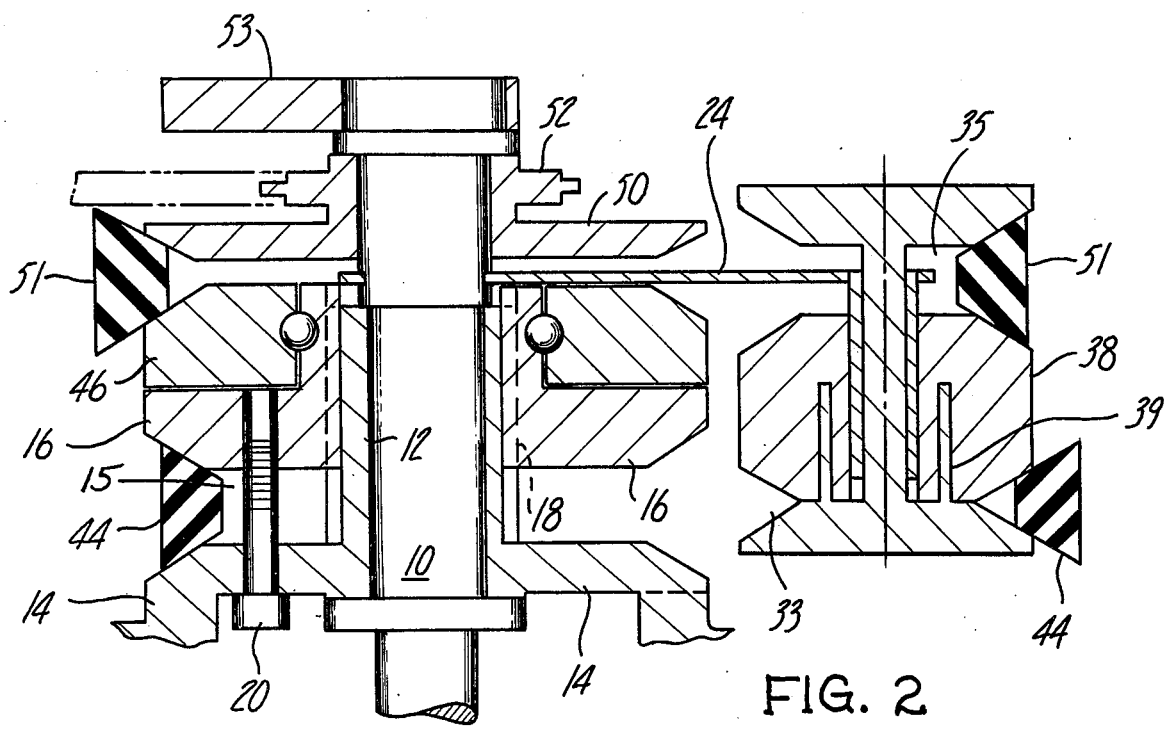
FIG. 2 is a sectional view through the FIG. 1 embodiment, taken with the components adjusted to a different speed ratio range setting.

FIG. 2 shows positions taken by certain components to produce rotation of output sprocket 52 in one direction. Screw 20 is adjusted to move pulley half section 16 away from pulley half section 14, thereby reducing the effective diameter of stationary sun pulley 15 from the nominal starting value shown in FIG. 1. Simultaneously pulley half section 46 is moved toward pulley half section 50, thereby increasing the effective diameter of sun pulley 45 beyond the nominal starting value shown in FIG. 1. These adjustments in the diameter of pulleys 15 and 45 produce changes in belt tension that are reflected in diameter changes for the planet pulleys 33 and 35. In this case the diameter of planet pulley 33 is increased, and the diameter of planet pulley 35 is decreased from the nominal starting values shown in FIG. 1.

During each revolution of shaft 10 belt 44 will travel along the surface of pulley 33 a distance equivalent to the circumference of stationary pulley 15. If the diameter of pulley 33 is one half the diameter of pulley 15 each revolution of shaft 10 around sun axis 22 will produce approximately two revolutions of pulley 33 around planet axis 28. The motion of pulley 33 around axis 28 is in a direction opposite to the motion of shaft 10. Thus, if shaft 10 is moving clockwise around axis 22 then pulley 33 will be moving counterclockwise around axis 28. The connected pulley 35 will also be moving counterclockwise around axis 28, so that the motion imparted to belt 51 by pulley 35 will be in a counterclockwise direction.

The clockwise rotation of carrier plate 24 around axis 22 will impose a translation force on belt 51 that opposes the belt translational force provided by pulley 35; the resultant speed of pulley 45 can be less or greater than the speed of shaft 10, depending on the relative magnitudes of the forces on belt 51. The approximate speed of pulley 45 can be roughly estimated by using the following equation:

$$O.S. = I.S. \left[ \frac{(D15 + a)(D33 + b)}{(D15 - a)(D33 - b)} - 1 \right]$$

where

O.S. is output speed of pulley 45,
I.S. is input speed of shaft 10,
D15 is the nominal diameter of pulleys 15 and 45,
$a$ is the diameter change of pulley 15,
D33 is the nominal diameter of pulleys 33 and 35, and
$b$ is the diameter change of pulley 33.

Numerically the value of $a$ will be less than the value of $b$ because the diameter of pulley 15 is greater than the diameter of pulley 33. Thus, a given decrease in the diameter of pulley 15 will produce a relatively large slack in belt 44; a large slack in the belt requires a relatively large diameter change in pulley 33. When $a$ and $b$ are zero the output speed of pulley becomes zero. When $a$ becomes negative then $b$ automatically becomes positive. Pulley 50 then reverses direction.

The value of $a$ is positive or negative according as screw 20 is turned in (to increase the diameter of pulley 15) or out (to decrease the diameter of pulley 15). FIG. 1 shows the apparatus in a neutral (zero output speed) condition. FIG. 2 shows the apparatus with screw 20 turned out to produce movement of pulley 50 in a direction opposite to shaft 10. With screw 20 turned in beyond the FIG. 1 position pulley 50 moves in the same direction as shaft 10.

The principal advantage of this invention is that it not only achieves speed ratio change, but also speed direction change and complete declutching i.e. zero output speed, with a single control device, such as screw 20. The structure is designed so that control device 20 is mounted in a stationary structure 14, thereby permitting convenient connection with the actuator (not shown).

Some variation in arrangement, size and orientation of components may be employed without departing from the invention, as recited in the attached claims.

I wish it to be understood that I do not desire to be limited to the exact details of construction shown and described for obvious modifications will occur to a person skilled in the art.

I claim:

1. A speed changer comprising a rotatable shaft (10) defining a sun axis; first and second sun pulleys encircling said shaft; the first sun pulley being stationary, and the second sun pulley being rotatable independently of the shaft;

the first sun pulley comprising a first stationary half section (14), and a second facing half section (16) keyed thereon for axial adjustment; the second sun pulley comprising a third half section (46) swivably connected to the second half section, and a facing fourth half section (50) swivably mounted on the shaft;

the second and third half sections being located between the first and fourth half sections, whereby axial adjustment of the second half section (16) serves to inversely vary the effective diameters of the two sun pulleys;

a planet pulley carrier (24) affixed to said shaft and extending radially outwardly therefrom; third and fourth planet pulleys rotatably arranged on the carrier for orbital movement around the sun axis;

said third planet pulley being radially aligned with the first sun pulley, and said fourth planet pulley being radially aligned with the second sun pulley;

said planet pulleys being comprised of a spool (34) and roller (38); the spool including two facing end flanges (32) and (40), and the roller being slidably keyed on the spool for axial movement in the space between the end flanges; the spacing between the end flanges being greater than the axial dimension of the roller whereby axial adjustment of the roller serves to inversely vary the effective diameters of the two planet pulleys;

a first V-belt (44) trained around the first sun pulley and third planet pulley, and a second V-belt (51) trained around the second sun pulley and fourth planet pulley.

2. The speed changer of claim 1, and further comprising adjustment screw means (20) trained between the first stationary half section (14) and second half section (16) parallel to the sun axis so that actuation of said screw means moves the second half section toward or away from the first half section.

* * * * *